United States Patent [19]

Sarbach

[11] Patent Number: 5,505,251
[45] Date of Patent: Apr. 9, 1996

[54] COOLING AND AIR CONDITIONING APPARATUS FOR AN ELECTRIC VEHICLE

[75] Inventor: Jean-Charles Sarbach, Les Essarts le Roi, France

[73] Assignee: Valeo Climatisation, LaVerriere, France

[21] Appl. No.: 142,267

[22] Filed: Oct. 25, 1993

[30] Foreign Application Priority Data

Oct. 26, 1992 [FR] France .................................. 92 12739

[51] Int. Cl.[6] .................................................... F25B 29/00
[52] U.S. Cl. .............................. 165/16; 165/42; 165/43; 165/64; 180/65.1; 237/12.3 B; 237/12.3 A; 219/202
[58] Field of Search .............................. 165/16, 42, 43, 165/64; 180/65.1; 237/12.3 A, 12.3 B; 219/202

[56] References Cited

U.S. PATENT DOCUMENTS

| 2,703,680 | 3/1955 | Nallinger | 237/12.3 B |
|---|---|---|---|
| 2,780,077 | 2/1957 | Jacobs . | |
| 4,072,186 | 2/1978 | Barton | 165/43 |
| 4,450,898 | 5/1984 | Tanino | 165/25 |
| 4,459,466 | 7/1984 | Nakagawa | 219/202 |
| 4,566,531 | 1/1986 | Stolz | 165/42 |
| 5,280,852 | 1/1994 | Dauvergne | 237/12.3 B |
| 5,299,631 | 4/1994 | Dauvergne | 237/12.3 B |

FOREIGN PATENT DOCUMENTS

| 0504643 | 9/1992 | European Pat. Off. | 165/42 |
|---|---|---|---|
| 0504653 | 9/1992 | European Pat. Off. | 165/42 |
| 2373017 | 12/1977 | France . | |
| WO9216389 | 10/1992 | WIPO . | |

*Primary Examiner*—John K. Ford
*Attorney, Agent, or Firm*—Morgan & Finnegan

[57] ABSTRACT

An electric vehicle has a radiator for cooling the traction motor of the vehicle, arranged in an air circuit which also contains a blower for circulating air in the circuit, and air flow regulating valves. The apparatus disclosed includes an air conditioning apparatus which comprises an evaporator and an auxiliary electric heating radiator, both of which are controlled jointly by a control member movable along a linear path to regulate the cooling or heating of the cabin as necessary, at the same time as the cooling of the motor.

7 Claims, 3 Drawing Sheets

COOLING AND AIR CONDITIONING APPARATUS FOR AN ELECTRIC VEHICLE

FIELD OF THE INVENTION

This invention relates to apparatus for cooling the traction or propulsion motor of a vehicle and for the heating and/or ventilation, or air conditioning, of the cabin of the same vehicle, the apparatus comprising a radiator for cooling the motor and for heating the cabin, together with a blower for producing a stream of ventilating air drawn from the cabin and/or from outside the vehicle, and an air inlet regulating member for varying from 0 to 100% a first ratio between the flow of air drawn from outside the vehicle and the total flow produced by the said blower, the apparatus further including an air outlet regulating member for progressively opening and closing an air outlet for exhausting air to outside the vehicle, and a mixing member for varying from 0 to 100% a second ratio which represents the fraction of the air flow coming into contact with a heat source located downstream of the said blower, with respect to the flow of air delivered into the cabin.

BACKGROUND OF THE INVENTION

Such an apparatus is typically used, in particular, in vehicles having electric traction or propulsion, with the heat source comprising an auxiliary source, which may for example be electric and which is brought into use when the heat emitted by the electric traction or propulsion motor and its associated equipment is insufficient to satisfy the heating requirements of the cabin of the vehicle.

DISCUSSION OF THE INVENTION

One object of the present invention is to provide a coordinated control means for the various adjustable members, or regulating means, of the apparatus, such that it responds in an optimum fashion to all the various conditions of use.

Another object is to minimise the propagation of energy from the apparatus, thus increasing the range of an electric vehicle.

According to the invention, an apparatus as defined above under "Field of the Invention" is characterised in that (a) the air inlet regulating member is located upstream of the blower, (b) the said heat source is the said cooling radiator, (c) the air flows freely from the blower to the heat source, and, downstream of the latter, is either evacuated to outside the vehicle, or delivered towards the cabin along paths which can be obturated by the air outlet regulating member and by the said mixing member respectively, and (d) the positions of the two regulating members, and of the mixing member and the air flow output of the blower, are controlled by a control member which is movable along a uniform course of travel which comprises:

a first portion along which: the said first ratio varies from a value close to, but distinct from, 100% to 0, with the said air outlet regulating member remaining fully open; the said second ratio remains equal to 0; and the air flow delivered by the blower varies progressively from a maximum value to a minimum value, and a second portion along which: the said first ratio varies from 0 to 100%, with the said air outlet regulating member being displaced progressively from its fully open position to its closed position; the said second ratio varies progressively from 0 to 100%; and the air flow delivered by the blower increases progressively from its said minimum value.

Some preferred features of the invention, complementary and/or alternative to each other, are as follows:

the apparatus comprises an air conditioning apparatus which includes an evaporator interposed between the blower on one side and, on its other side, the said heat source and mixing member, the said air conditioning apparatus being controllable by the said control member in such a way as to operate only over the said second portion of the course of travel of the latter;

the said heat source further includes an auxiliary source controllable by the said control member, the second portion of the said course of travel of the latter being subdivided into a first phase along which the auxiliary source is out of service, and a second phase along which the said auxiliary source is in service;

the auxiliary source produces a heat output which increases along the said second phase;

the air flow delivered by the blower reaches an intermediate value at the end of the first phase, and the said maximum value at the end of the second phase;

the said auxiliary source is an electric radiator;

the apparatus includes a first air circuit branch, containing the blower together with the evaporator if any, the said first branch being connected at its upstream end to a recirculated air inlet and a fresh air inlet, the said inlets being controlled by the said air inlet regulating member, the said first branch being connected downstream thereof to air outlets for passing air to the cabin, the apparatus further including a second air circuit branch which is branched from the said first branch downstream of the blower (and evaporator if any), the said second branch containing the heat source, with the said mixing member being arranged to obturate, in its two respective extreme positions, the first branch and the downstream junction between the two said branches, the air outlet regulating member controlling an air outlet for exhausting air to outside the vehicle, this outlet being open into the second branch downstream of the heat source.

Further features and advantages of the invention will appear more clearly on a reading of the description which follows, of a preferred embodiment of the invention, this description being given by way of example only and with reference to the accompanying drawings.

DESCRIPTION OF A PREFERRED EMBODIMENT OF THE INVENTION

Figure 1:
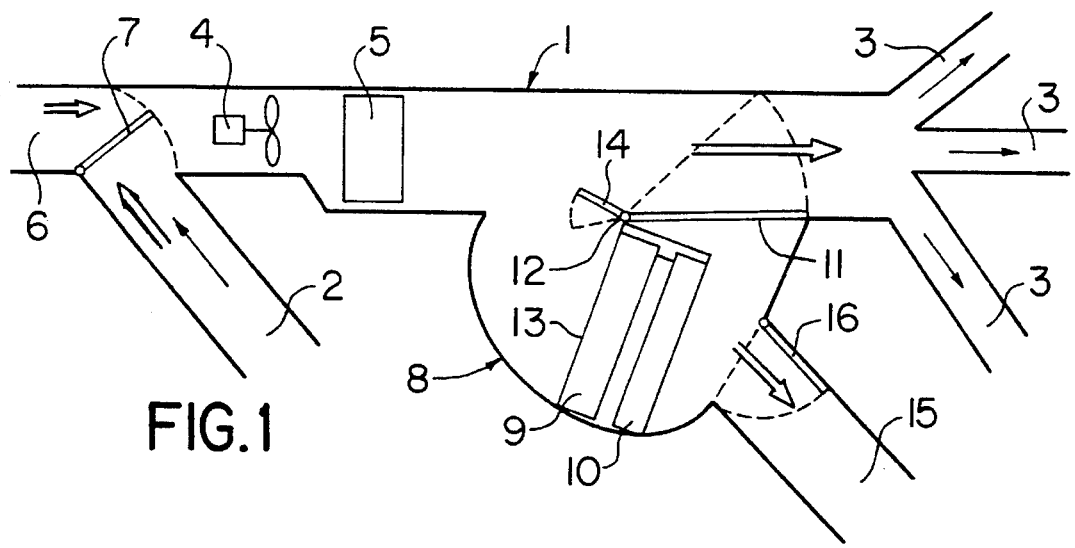
FIGS. 1, 2, 3, 4, 5 and 6 show diagrammatically certain elements of an apparatus in accordance with the invention, these being shown in six different operating states in these six Figures respectively.

FIGS. 1 through 6 show the air circuit of a cooling apparatus for a traction motor or electric propulsion motor for a vehicle, and for air conditioning purposes in the cabin of the same vehicle. The air circuit comprises a main branch 1 which extends between a recirculated air inlet 2, which is connected to the cabin and in particular to the rear part of the latter, and outlets 3 which lead air towards the cabin, in particular to the base of the windshield, to the fascia, and to the lower part of the cabin. It can accordingly be seen that the branch 1 and the cabin together define a closed loop for flow of air. The branch 1 contains a blower 4, together with an evaporator 5 which is part of a flow circuit for refrigerant fluid (which is not shown fully in the drawings). The evaporator 5 is arranged downstream of the blower 4, i.e. between the latter and the outlets 3.

Figure 3:
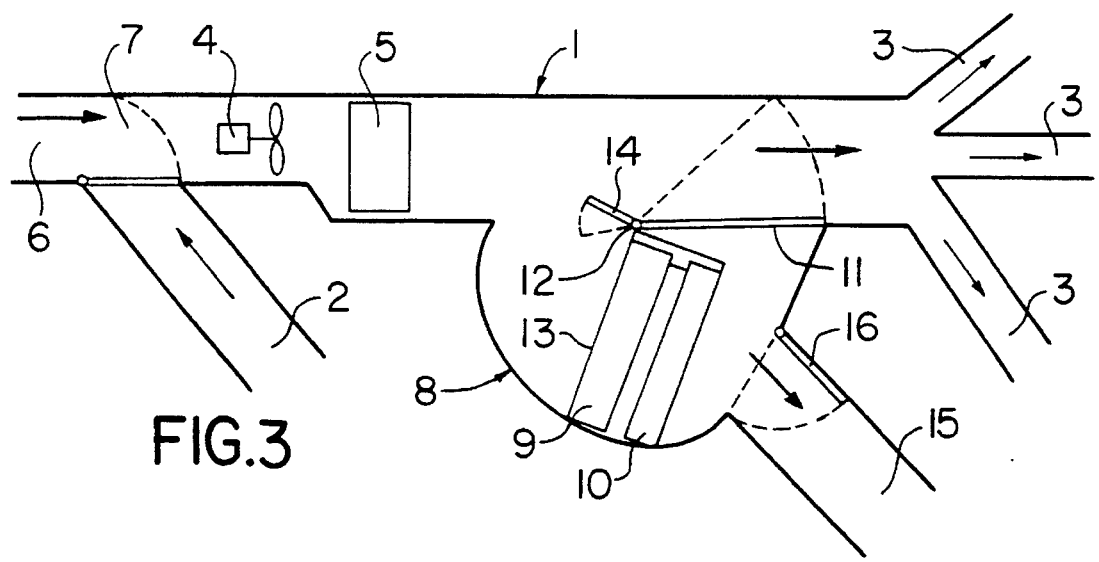
Figure 5:
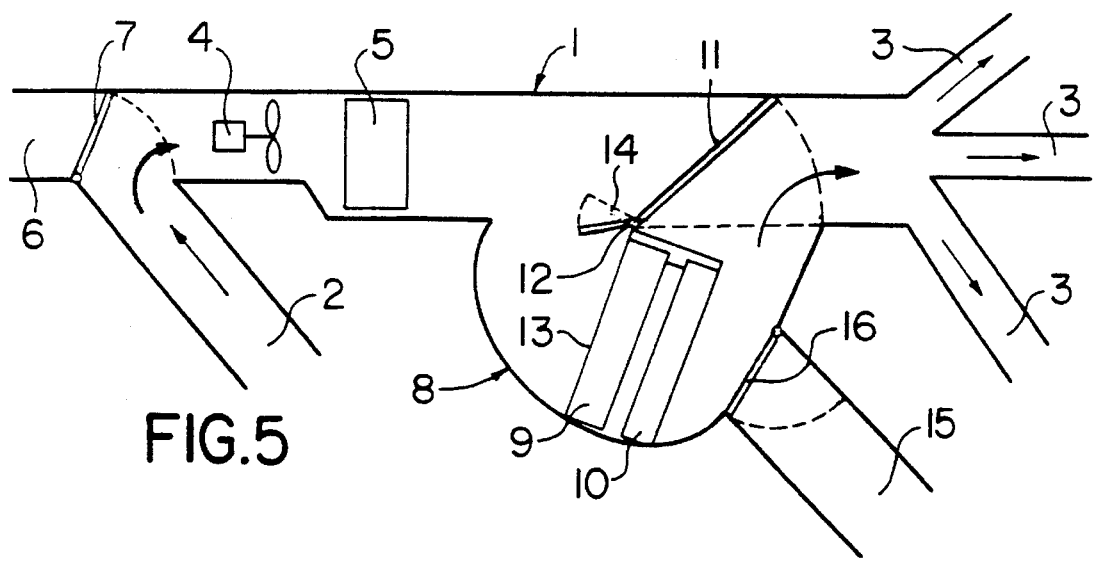
Figure 6:
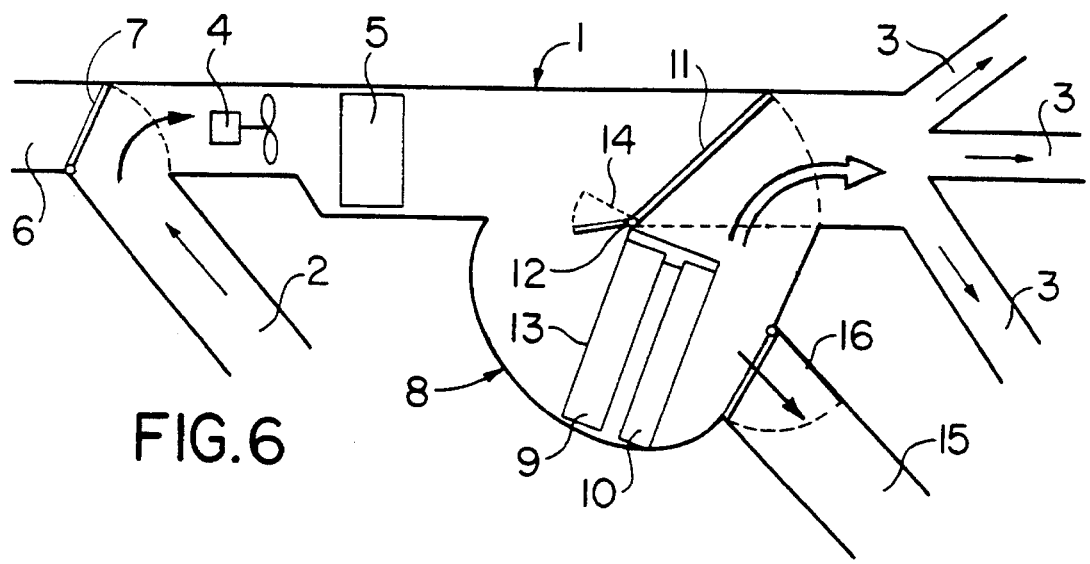
Figure 6A:
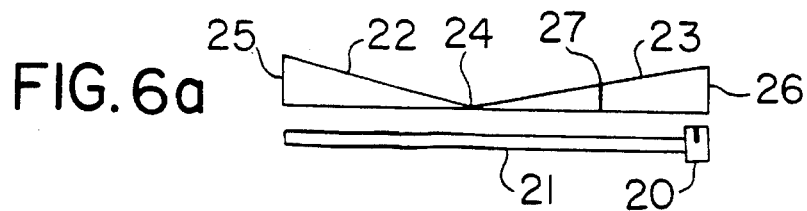

A fresh air inlet 6, leading from outside the vehicle, opens into the branch 1 upstream of the blower 4, while an air inlet flap valve 7 is arranged for pivoting movement between a first position and a second position. The first position is shown in FIGS. 5 and 6: in this position the air inlet valve 7 covers the fresh air inlet 6, while in its second position which is shown in FIG. 3, the valve 7 covers the recirculated air inlet 2. In this way the valve 7 is able to vary from 0 to 100% the ratio between the flow of air drawn from outside the vehicle and the total air flow produced by the blower 4.

The circuit also includes, downstream of the evaporator 5, a side branch 8. A radiator unit extends over the whole of the transverse cross section of this side branch 8. This radiator unit consists of a first radiator 9, in which there flows a cooling fluid for the electric traction motor and for its associated auxiliary equipment (i.e. electronic power control unit, supply battery etc.), together with an auxiliary electric radiator 10 for heating the cabin of the vehicle. This radiator 10 consists typically of a positive temperature coefficient electric resistance heater.

The main branch 1 and the side branch 8 are separated from each other by a mixing valve 11 in the form of a flap valve arranged to pivot about an axis 12. The axis 12 extends along that edge of the face 13 of the radiator unit 9, 10 through which air delivered by the blower 4 enters, and which faces towards the main branch 1. The mixing valve 11 is arranged to be displaced, in its pivoting movement, between a first position shown in FIGS. 1 to 3, and a second position shown in FIGS. 5 and 6. In the first position, the valve 11 closes the downstream junction between the main branch 1 and the side branch 8, thus preventing air heated by the radiator unit 9, 10 from being delivered into the cabin of the vehicle. In its second position, the valve 11 obturates the main branch 1 between its two junctions with the side branch 8, so that air delivered towards the cabin is now obliged to pass through the radiator unit 9, 10. The mixing valve 11 has an auxiliary flap 14 which extends downstream from the axis 12, and which defines an obtuse angle with the downstream main flap of the mixing valve. The auxiliary flap 14 acts as a deflector which enables air to enter into the side branch 8 in the first position of the mixing valve, while in the second position of the latter the auxiliary flap causes air to be admitted into the main branch 1. In this second position of the valve, the auxiliary flap 14 extends across a minor part of the transverse cross section of the side branch 8.

Downstream of the radiator unit 9, 10, an air outlet 15, for exhausting air to outside the vehicle, is open into the side branch 8. This air outlet 15 has a flap-type regulating valve 16, which is arranged to be displaced between a closed position shown in FIGS. 5 and 6, and a fully open position shown in FIGS. 1 to 3.

The blower 4, the air conditioning apparatus which includes the evaporator 5, the auxiliary radiator 10 and the three valves 7, 11 and 16 are controlled (through any suitable means which are not a part of the present invention), by a single control member in the form of a cursor 20 (see FIGS. 1a to 6a). This cursor 20 is arranged to be displaced along a horizontal guide slot 21 which is formed in a control panel within reach of the driver of the vehicle. The cursor may be connected to a lever or sliding element which is moved along this slot. Above the slot 21 on the control panel, graphic symbols are presented which serve as indicators for the various positions of the cursor 20. These symbols comprise (in this particular, non-limiting, example) a blue triangle 22 and a red triangle 23, which are elongated in the horizontal direction from a common apex 24 which is aligned with a mean position of the cursor 20. The respective opposed sides 25 and 26 of this apex are aligned with the left hand and right hand ends, respectively, of the path of travel of the cursor 20. The triangle 23 is interrupted between the apex 24 and the side 26 by a narrow vertical band 27, which is of the same base colour as that with which the triangles are surrounded. Going from left to right, the blue triangle 22 corresponds to control of cooling of the cabin at decreasing power, while the red triangle 23 corresponds to the control of heating of the cabin at an increasing power.

Figure 1A:
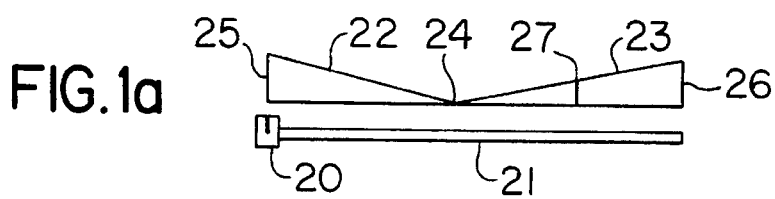
FIGS. 1a, 2a, 3a, 4a, 5a and 6a show the positions of a control member which corresponds respectively to the operating states shown in FIGS. 1, 2, 3, 4, 5 and 6 respectively.

FIGS. 1 and 1a show the position of the cursor 20, and the positions of the valves which are controlled by it, in order to obtain maximum cooling of the cabin. The air conditioning apparatus is in operation, and the blower 4 is supplied at its maximum voltage, which ensures that a maximum flow of heat is transferred to the evaporator 5 by the air stream which is flowing in the main branch 1. The mixing valve 11 is in its first position, in which the main branch 1 is fully open, so that cooled air is given free access to the outlets 3 which deliver the air to the cabin. The outlet valve 16 is in its fully open position, enabling the air heated by the radiator 9 (for cooling the traction motor) to be evacuated out of the vehicle. The inlet valve 7 is so controlled as to allow fresh air to be admitted from outside the vehicle so as to compensate for this loss of heated air, but it should be noted that the valve 7 is closer to its first position than to its second position, so that most of the air flowing in the main branch 1 is recirculated air.

Figure 2:
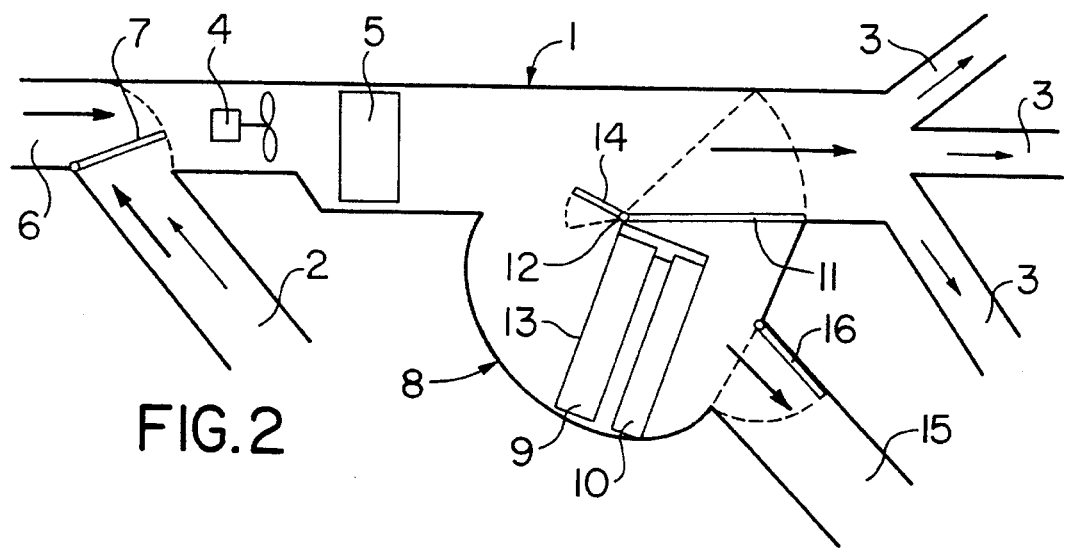
Figure 2A:
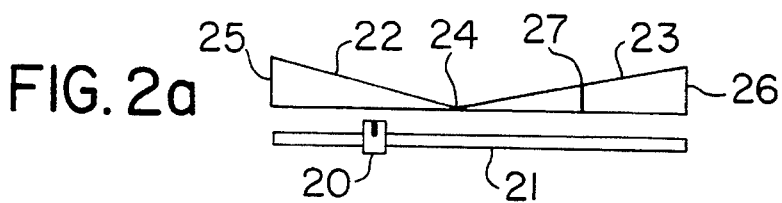
Figure 3A:
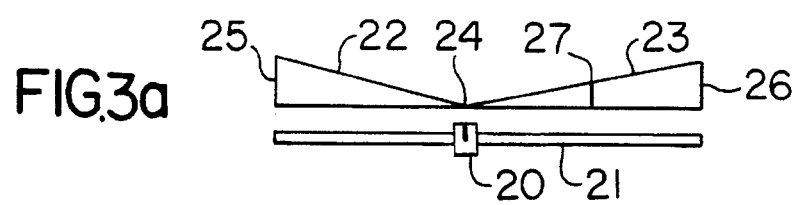

Referring now to FIGS. 2 and 2a, these correspond to an intermediate position of the cursor 20, between the maximum cooling position shown in FIG. 1a, and the neutral position shown in FIG. 3a. The progressive displacement of the cursor in this first part of its travel is accompanied by a progressive diminution in the supply voltage of the blower 4, down to a minimum value, and is also accompanied by a progressive displacement of the air inlet valve 7, to its second position. The air flow produced by the blower, the heat flow passed to the evaporator, and the air flow in the cabin, are progressively reduced. The positions of the mixing valve 11 and regulating valve 16 are unchanged in FIG. 2 as compared with FIG. 1.

Referring to FIGS. 3 and 3a, these show the neutral position which is reached by the cursor 20 at the end of the first part of its travel, together with a corresponding position of the air inlet valve 7. In addition, the air conditioning apparatus is here out of use: in this position, the apparatus acts solely as a means for cooling the motor and its associated equipment.

Figure 4:
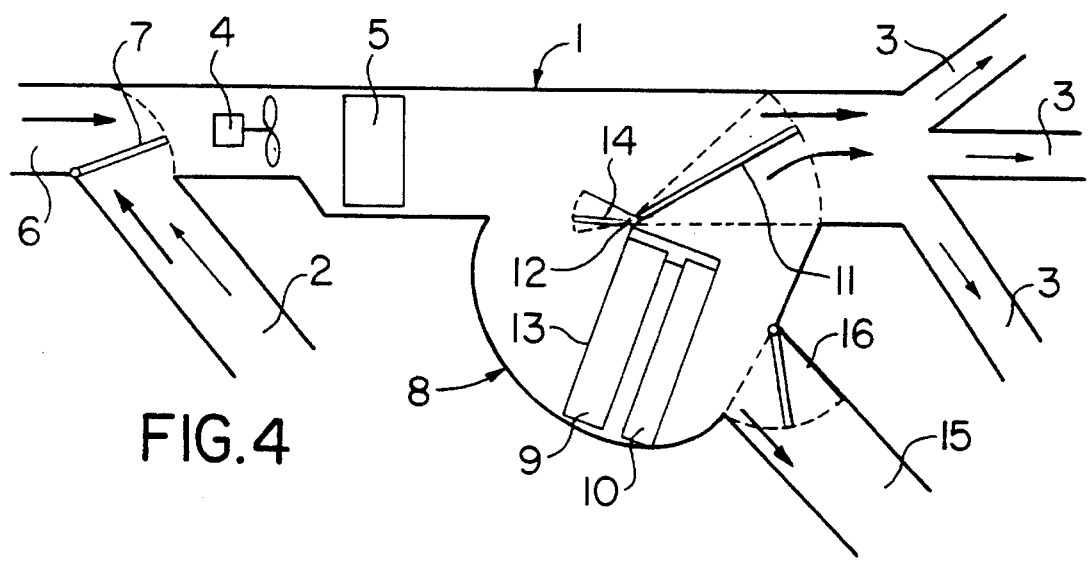
Figure 4A:
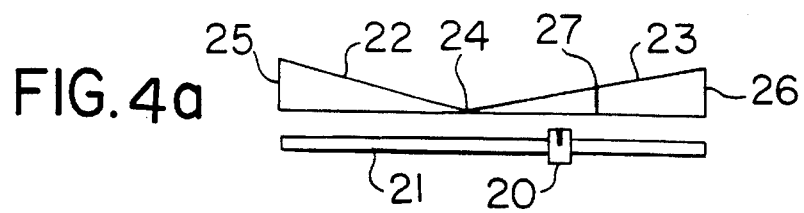

FIGS. 4 and 4a relate to a first phase of the "heating" part of the course of travel of the cursor 20, corresponding to a low level of heating and ending in line with the band 27. As the cursor is moved progressively from the point 24 to the band 27, the supply voltage of the blower 4 is increased progressively from its minimum value to an intermediate value, while the inlet valve 7 pivots from its second position to its first position, the mixing valve 11 pivots from its first position to its second position, and the outlet valve 16 pivots from its fully open position to its closed position. It will of course be realised that the air conditioning apparatus remains out of use. In this way, it is possible to increase, at the same time, the air flow produced by the blower 4, the fraction of this air flow which passes through the first or coolant fluid radiator 9, and the fraction of the same air flow which passes through the cabin of the vehicle. As a result of these linked actions, the flow of heat supplied to the cabin itself is progressively increased.

Figure 5A:
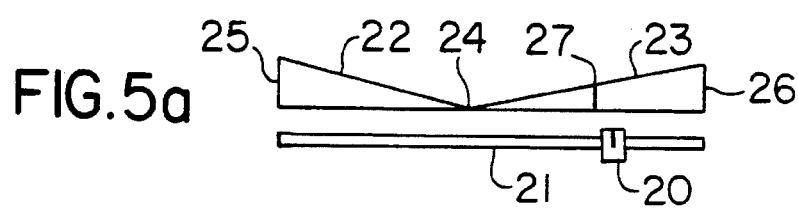

FIG. 5a, to which reference is now made, shows the cursor 20 in the second phase of the "heating" portion of its course of travel, beyond the band 27. In this zone, as shown in FIG. 5, the positions of the valves are the final positions of the preceding zone described above. The supply voltage of the blower 4 continues to be increased towards its maximum value, which is reached at the extreme position of the cursor 20 shown in FIG. 6a. A voltage is applied to the auxiliary radiator 10, so that the latter supplies additional heat. In the event that the radiator 10 has a positive temperature coefficient heating resistor, the power which it dissipates increases equally with the air flow, which increases even more the rate at which heat is supplied to the cabin.

In a modification, the air conditioning apparatus, and therefore the evaporator 5 that forms part of it, may be omitted, with the control of the other elements being unchanged except in respect of the air inlet valve 7, which remains in a position in which it holds the fresh air inlet fully open. In the "cold" phase of the course of travel of the control member (i.e. in this example the cursor 20), the delivery of refrigerated air corresponding to a decreasing negative heat flow is replaced by a simple ventilating action in decreasing volumetric flow. This last mentioned type of operation can also be obtained by taking any existing air conditioning apparatus out of service, independently of the position of the control member 20, with a view to saving energy, or in the event of failure of the air conditioning apparatus.

The control member 20 may, instead of being arranged to be operated manually, be replaced by an automatic control member which is operated in accordance with a predetermined programme.

What is claimed is:

1. Apparatus for cooling a propulsion motor of a vehicle and for at least one function selected from heating, ventilating and air conditioning of a cabin of the same vehicle, with the apparatus being adapted in any event for heating the said cabin, the apparatus comprising means defining an air circuit including the cabin; a radiator arranged in said circuit for cooling the propulsion motor and for heating the cabin; air inlet means connected to the air circuit for introducing air from at least one of the zones comprising the cabin and the environment outside the vehicle; a blower in the air circuit downstream of said inlet means for producing a current of ventilating air drawn from the latter; an air inlet regulating means associated with the air inlet means, for varying from 0 to 100% a first ratio between the air flow drawn from outside the vehicle and the total flow produced by the blower; an air outlet means connected to the said air circuit for exhausting air from the latter to the environment outside the vehicle; air outlet regulating means associated with the said air outlet means for progressively opening and closing the latter, the apparatus further comprising a heat source in the air circuit downstream of the said blower, and mixing means in the air circuit for varying from 0 to 100% a second ratio representing the fraction of the air flow coming into contact with the said heat source with respect to the air flow delivered into the cabin, wherein:

(a) the said air inlet regulating means is upstream of the blower, (b) the said heat source is the said cooling radiator, (c) the air circuit defines means for permitting free flow of air through it from the blower to the heat source, and means downstream of the said heat source defining a first air flow path for evacuation of the air to outside the vehicle and a second air flow path towards the cabin, the said air outlet regulating means being arranged to obturate the said first path and the said mixing means being arranged to obturate the said second path, (d) the apparatus further includes a control member and guide means defining a uniform course of travel for the said control member, the latter being operatively connected to the two said regulating means and to the mixing means, and to the blower, to control the positions of the regulating means and mixing means and the air flow output of the blower, with the said guide means defining the said uniform course of travel in the form of:

a first portion along which: the said first ratio varies from a value close to, but distinct from, 100% to 0; the air outlet regulating means remains fully open; the said second ratio remains equal to 0; and the output of the blower varies progressively from a maximum value to a minimum value, and a second portion along which: the said first ratio varies from 0 to 100%; the air outlet regulating means is displaced progressively from its fully open to its fully closed position; the said second ratio varies progressively from 0 to 100%; and the air flow of the blower increases progressively from its said minimum value.

2. Apparatus according to claim 1, comprising an air conditioning apparatus which includes an evaporator interposed between the blower on one side and the said heat source and mixing means on its other side, the said control member being operatively connected to the air conditioning apparatus in such a way that the latter operates only in the said second portion of its course of travel.

3. Apparatus according to claim 1, wherein the said heat source further includes an auxiliary source operatively connected to the said control member, the said second portion of the course of travel of the control member being subdivided into a first phase in which the auxiliary source is out of service and a second phase in which the auxiliary source is in service.

4. Apparatus according to claim 3, wherein the said auxiliary source is arranged to produce an increasing heat output along the said second phase.

5. Apparatus according to claim 3, wherein the blower is arranged to give an air flow having an intermediate value at the end of the said first phase and a maximum value at the end of the said second phase.

6. Apparatus according to claim 3, wherein the said auxiliary source is an electric radiator.

7. Apparatus according to claim 1, wherein the said means defining the circuit comprises a first air circuit branch containing the blower, the said air inlet means comprising a recirculated air inlet and a fresh air inlet for admitting air from outside the vehicle, the said inlets being connected to the said first branch upstream of the latter, the air inlet regulating means being associated with the said inlets from controlling them both, the apparatus further including air outlets downstream of the said first branch for delivering air into the cabin, and a second air circuit branch branched from the said first branch downstream of the blower, the said heat source being arranged in the said second branch so as to define a downstream junction between the two branches, the mixing means being arranged at the said junction for obturating in its two extreme positions the said first branch and the said junction, respectively, the air outlet for exhausting air from the circuit to outside the vehicle being open into the said second branch downstream of the heat source, with the air outlet regulating means being arranged at the said air outlet for controlling the latter.

* * * * *